United States Patent
Chang et al.

(10) Patent No.: US 7,014,342 B2
(45) Date of Patent: Mar. 21, 2006

(54) LIGHT GUIDING APPARATUS FOR AN ILLUMINATION SYSTEM

(75) Inventors: Sean Chang, Taoyuan Hsien (TW); Albert Lin, Taoyuan Hsien (TW)

(73) Assignee: Delta Electronics, Inc, Taoyuan Hsien (TW)

( * ) Notice: Subject to any disclaimer, the term of this patent is extended or adjusted under 35 U.S.C. 154(b) by 304 days.

(21) Appl. No.: 10/616,918

(22) Filed: Jul. 11, 2003

(65) Prior Publication Data

US 2004/0160758 A1     Aug. 19, 2004

(30) Foreign Application Priority Data

Feb. 14, 2003   (TW) ............................ 92202432 U

(51) Int. Cl.
*F21V 7/00*    (2006.01)

(52) U.S. Cl. .................. 362/299; 362/298; 353/99; 353/33

(58) Field of Classification Search ............ 353/99, 353/33, 30, 31, 34, 37; 362/347, 341, 298, 362/299

See application file for complete search history.

(56) References Cited

U.S. PATENT DOCUMENTS

| | | | |
|---|---|---|---|
| 6,883,922 B1 * | 4/2005 | Kurematsu et al. ......... 359/859 |
| 2004/0150793 A1 * | 8/2004 | Chang et al. | |
| 2004/0201898 A1 * | 10/2004 | Chang et al. | |

* cited by examiner

*Primary Examiner*—Laura K. Tso
(74) *Attorney, Agent, or Firm*—Hoffman, Wasson & Gitler, PC

(57) ABSTRACT

The light-guiding apparatus has a light tunnel and an ellipsoidal reflector. Light emitted from the light tunnel is reflected and focused on a DMD chip by the ellipsoidal reflector. The light tunnel and a long axis of the ellipsoidal reflector form an angle. The angle and an eccentricity of the ellipsoidal reflector are used to modify the light emitted from the light tunnel. Thus, the light is made to match an incident angle and an effective dimension of a digital micromirror device receiving the light.

12 Claims, 3 Drawing Sheets

LIGHT GUIDING APPARATUS FOR AN ILLUMINATION SYSTEM

BACKGROUND OF THE INVENTION

1. Field of Invention

The present invention relates to a projector. More particularly, the present invention relates to a light-guiding apparatus for an illumination system.

2. Description of Related Art

Since optical projectors were developed, they have been applied in many fields. They serve an ever expanding range of purposes, from consumer products to high technology, such as by projecting and displaying enlarged still images or motion pictures of presentations on a projection screen during conferences. However, as projector applications broaden, demands on contrast and brightness of projectors increase. The contrast and brightness of a projector are mostly determined by its illumination system.

FIG. 1 is a schematic view of an illumination system and a guiding apparatus of a conventional illumination system and light-guiding apparatus. In the existing framework of the conventional illumination and guiding apparatus, light emitted from a light source 102 is collected and reflected by an ellipsoidal reflector 104 to pass through a color wheel 106, and then enters a light tunnel 108. An outlet of light tunnel 108 is square-shaped, so light is uniformly emitted from the light tunnel 108 with a square cross section after being reflected many times inside the light tunnel 108.

The square-section light passes through a relay lens 110 composed of several lenses and a light path turning device 112 to arrive at a digital micro-mirror device (DMD) chip 114. The light path turning device 112 in FIG. 1 is a total internal reflection (TIR) prism. An image generated from the DMD chip 114 is turned by the light path turning device 112, and then is projected to a screen 118 by a projection lens 116.

The relay lens 110 in FIG. 1 is a light-guiding apparatus for transmitting light from the light tunnel 108 to the DMD chip 114. The conventional light-guiding apparatus, such as the relay lens 110 composed of several lens, is used to modify the square-section light emitted from the light tunnel 108 to match an incident angle and an effective dimension of the DMD chip 114. The relay lens 110 usually is composed of more than three lenses. However, an aberration of the relay lens 110 itself twists or blurs edges of the square-section light, thus causing the light spot to be irregular. Furthermore, the light from the light source 102 includes many different wavelengths and these different wavelengths of light generate a chromatic aberration while passing through the relay lens 110.

Though the aberrations are reduced by optical designs to improve image quality, the multiple lenses are complicated in design and expensive. In addition, if more lenses are added to the relay lens 110 to compensate for the aberrations, light intensity is unavoidably lost, which lowers the performance of a projector.

SUMMARY OF THE INVENTION

It is therefore an objective of the present invention to provide a light-guiding apparatus for an illumination system that resolves the aberration problems of a conventional light-guiding apparatus of an illumination system in a projector.

In accordance with the foregoing and other objectives of the present invention, a light-guiding apparatus for an illumination system is described. The invention provides an ellipsoidal reflector to replace the conventional relay lens. Light emitted from the light tunnel is reflected to and focused on a DMD chip by the ellipsoidal reflector. The light tunnel and a long axis of the ellipsoidal reflector form an angle. The angle and an eccentricity of the ellipsoidal reflector are used to modify the light emitted from the light tunnel. Thus, the light is made to match an incident angle and an effective dimension of a digital micro-mirror device receiving the light.

In one preferred embodiment of the present inventions, the ellipsoidal reflector is a partial ellipsoid casing with a dimension larger than a dimension of light emitted thereon by a divergent angle of the light tunnel, thus reflecting light completely. Moreover, the invention further provides an optical compensation device, such as a wedge prism or a compensation lens, on a light path between the ellipsoidal reflector and the DMD chip to compensate for an asymmetric aberration generated by the ellipsoidal reflector.

In another preferred embodiment of the present inventions, two ellipsoidal reflectors are used to guide light in this preferred embodiment, and the asymmetric aberration is reduced by modifying relative angles and eccentricities of the two ellipsoidal reflectors to make the light spot uniform. Moreover, light in this preferred embodiment is completely transmitted by reflection and the chromatic aberration therefore does not exist.

The invention uses an ellipsoidal reflector to replace a conventional relay lens, so as to prevent the chromatic aberration caused by the conventional relay lens. In addition, an optical compensation device that affects the chromatic aberration less is provided to resolve the aberration at the same time. Furthermore, a framework with two ellipsoidal reflectors provides a light spot with no chromatic aberration and the smallest possible spherical aberration on the DMD chip.

The invention uses reflections to guide light, thus enhancing light intensity substantially and improving the efficiency of a light-guiding apparatus. Moreover, the light-guiding apparatus of the invention is easier to design than the conventional relay lens composed of several lenses. Since it includes fewer devices, the invention is easily maintained and cheaper to produce.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
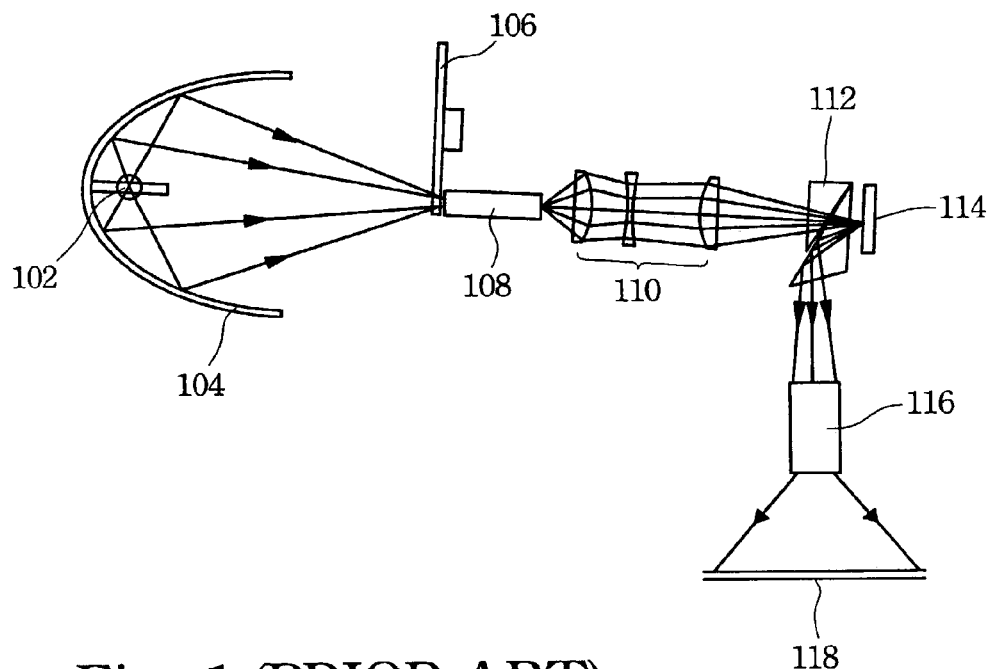
FIG. 1 is a schematic view of an illumination system and a light-guiding apparatus of a conventional illumination system.

Reference will now be made in detail to the present preferred embodiments of the invention, examples of which are illustrated in the accompanying drawings. Wherever possible, the same reference numbers are used in the drawings and the description to refer to the same or like parts.

The present invention provides a light-guiding apparatus for an illumination system to resolve the aberration problems of a conventional light-guiding apparatus of an illumination system in a projector.

The invention provides an ellipsoidal reflector to replace the conventional relay lens 110 in FIG. 1. Light emitted from the light tunnel is reflected and focused onto a DMD chip by the ellipsoidal reflector. The light tunnel and a long axis of the ellipsoidal reflector form an angle. The angle and an eccentricity of the ellipsoidal reflector are used to modify the light emitted from the light tunnel. Thus, the light is made to match an incident angle and an effective dimension of a digital micro-mirror device receiving the light.

Figure 2:
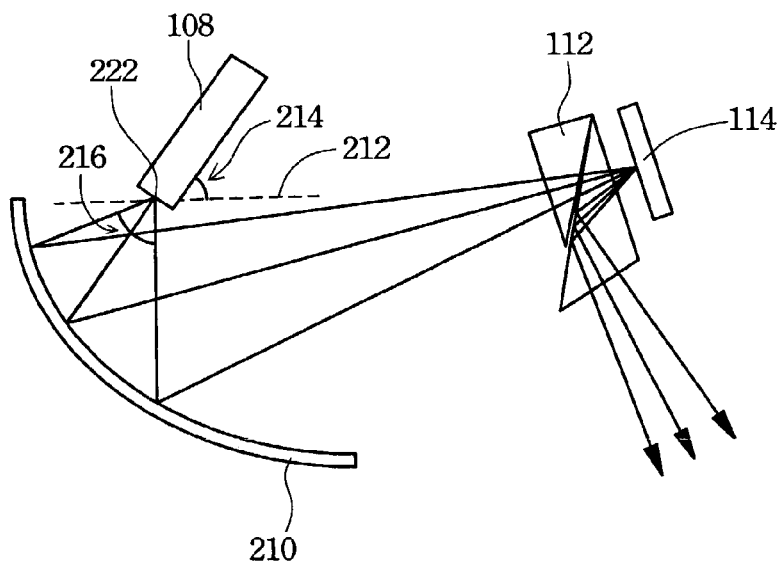
FIG. 2 is a schematic view according to one preferred embodiment of this invention.

FIG. 2 is a schematic view of one embodiment of the invention. An outlet of a light tunnel 108 is located at a first focus 222 of an ellipsoidal reflector 210, and the light tunnel 108 and a long axis 212 of the ellipsoidal reflector 210 form an angle 214. By the optical reflection characteristic of the ellipsoid, the ellipsoidal reflector 210 collects and reflects light emitted from the light tunnel 108 located at the first focus 222 to another focus of the ellipsoidal reflector 210. However, the light must pass through a light path turning device 112 before arriving at the other focus, and the light path turning device 112 slightly changes the propagation path of the light, so that a DMD chip 114 for receiving the light does not overlay with that other focus.

Because dimension and an divergent angle 216 of light emitted from the outlet of the light tunnel 108 are constant, the invention modifies the light emitted from the light tunnel 108 by the angle 214 and an eccentricity of the ellipsoidal reflector 210 to match an incident angle and an effective dimension of a digital micro-mirror device. The ellipsoidal reflector 210 is a partial ellipsoid casing with a dimension larger than a dimension of light emitted thereon from the divergent angle 216, thus reflecting light completely. In this embodiment, the light path turning device is a TIR prism; however, other light path turning devices of other types be used in the invention, which is not limited by this embodiment.

When the ellipsoidal reflector 210 of the invention is used to replace the conventional relay lens 110 (as illustrated in FIG. 1), the chromatic aberration generated by different wavelengths of light passing through the lens is prevented because the light is directly reflected by the ellipsoidal reflector 210. The loss of light intensity caused by light passing through several lenses is also reduced.

Nevertheless, light from the light tunnel to the ellipsoidal reflector 210 is off-axis, which means that light is not emitted along an axis of symmetry of the ellipsoidal reflector 210, so a light spot reflected by the ellipsoidal reflector 210 on the DMD chip 114 is not uniform. This is called an asymmetric aberration. The invention further provides an optical compensation device on a light path between the ellipsoidal reflector 210 and the DMD chip 114 to make the light spot on the DMD chip 114 uniform.

Figure 3A:
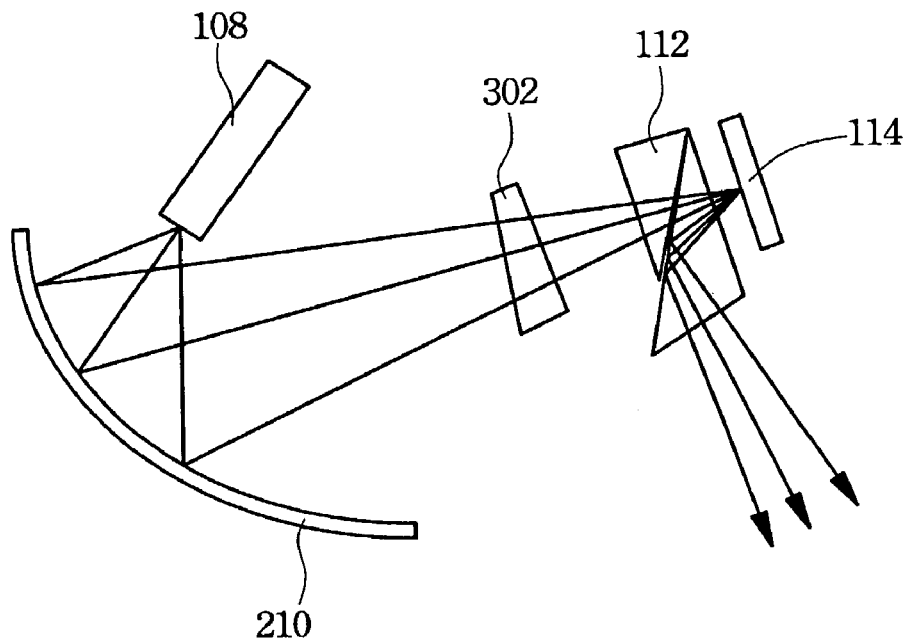
FIG. 3A is a schematic view according to another preferred embodiment of this invention.

FIG. 3A is a schematic view of another preferred embodiment of the invention. The preferred embodiment provides a wedge prism 302 in the embodiment FIG. 2 to compensate for the asymmetric aberration caused by the ellipsoidal reflector 210. Light first is emitted from the light tunnel 108 and reflected by the ellipsoidal reflector 210 and then arrives at the wedge prism 302. Since light is transmitted at different velocities in different media, a variation of a thickness of the wedge prism 302 is used to adjust the path of light. Lengths of light paths of different areas in the wedge prism 302, through which light is transmitted, are therefore adjusted to reduce the asymmetric aberration of the light spot on the DMD chip 114.

Figure 3B:
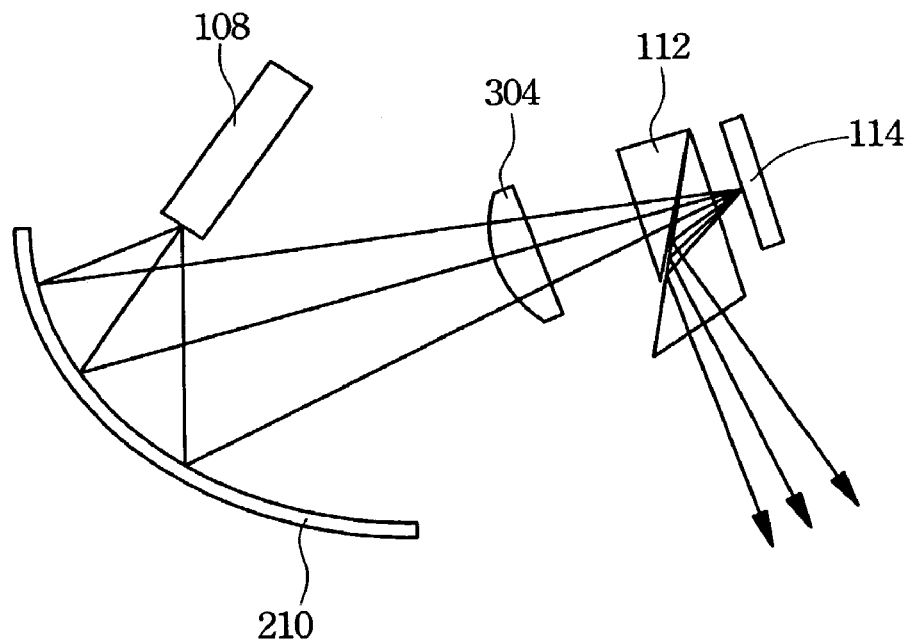
FIG. 3B is a schematic view according to another preferred embodiment of this invention.

FIG. 3B is a schematic view of another preferred embodiment of the invention. This preferred embodiment is similar to that illustrated in FIG. 3A and provides a compensation lens 304 in the embodiment of FIG. 2 to compensate for the asymmetric aberration caused by the ellipsoidal reflector 210. The compensation lens 304 in FIG. 3B is a biconic lens with two asymmetric axes. The asymmetry of two axes in the compensation lens 304 is used to adjust lengths of light paths along which light is transmitted to reduce the asymmetric aberration generated by the ellipsoidal reflector 210.

The foregoing preferred embodiments provide an optical compensation device, such as a wedge prism 302 or a compensation lens 304 in the light path between the light tunnel 108 and the DMD chip 114 to compensate for the asymmetric aberration generated by the ellipsoidal reflector 210 due to different lengths of the light path along which light is transmitted in media. Though the optical compensation device still causes a chromatic aberration, a thickness of the single optical compensation device utilized here is very thin (concerning the wedge prism 302) and a curvature thereof is very small (concerning the compensation lens 304), so the effect of chromatic aberration is much less than that of the conventional relay lens 110 composed of several lenses.

Figure 4:
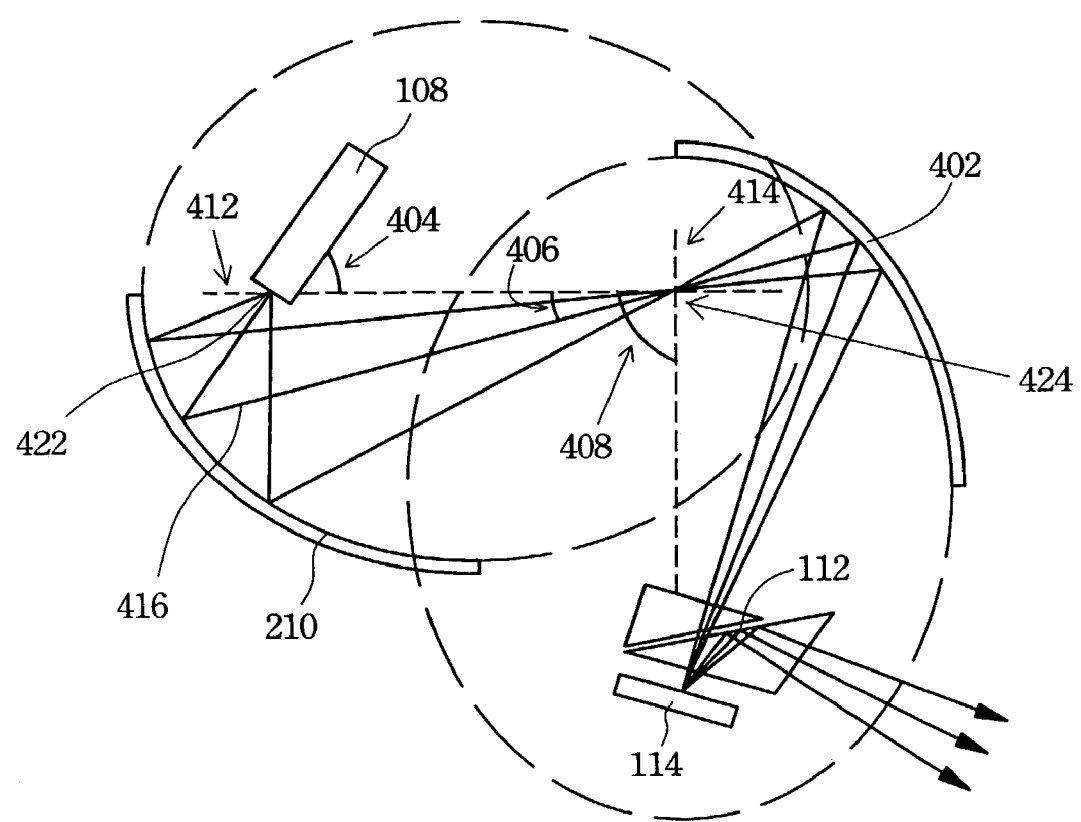
FIG. 4 is a schematic view according to another preferred embodiment of this invention.

FIG. 4 is a schematic view of another preferred embodiment of the invention. Two ellipsoidal reflectors are used to guide light in this preferred embodiment, and the asymmetric aberration is reduced by modifying relative angles and eccentricities of the two ellipsoidal reflectors to make the light spot uniform. Moreover, light in this preferred embodiment is transmitted entirely by reflection, and the chromatic aberration therefore does not exist.

An outlet of the light tunnel 108 is located on a focus 422 of the ellipsoidal reflector 210, and another focus 424 of the ellipsoidal reflector 210 overlays a focus of the ellipsoidal reflector 402. Light emitted from the light tunnel 108 is first collected and reflected to the focus 424 by the ellipsoidal reflector 210. After passing through the focus 424, light is collected by the ellipsoidal reflector 402 and then is reflected to another focus of the ellipsoidal reflector 402. As in the embodiment of FIG. 2, a light path turning device 112 is at the other focus of the ellipsoidal reflector 402. The light path turning device 112 slightly changes the propagation path of the light, so that a DMD chip 114 for receiving the light does not overlay with that other focus of the ellipsoidal reflector 210.

The light tunnel 108 and a long axis 412 of the ellipsoidal reflector 210 form an angle 404, the long axis 412 of the ellipsoidal reflector 210 and a main light path 416 of the light form an angle 406 at the focus 424, and the long axis 412 of the ellipsoidal reflector 210 and a long axis 414 of the ellipsoidal reflector 402 form an angle 408. The angles 404, 406 and 408, and an eccentricity of the ellipsoidal reflector 210 and an eccentricity of the ellipsoidal reflector 402 are used to modify the light emitted from the light tunnel 108 to match an incident angle and an effective dimension of the DMD chip 114.

The ellipsoidal reflectors 210 and 402 both are partial ellipsoid casings with dimensions larger than dimensions of light emitted thereby to make sure that light is entirely reflected by the ellipsoidal reflectors. In another preferred embodiment, the angle 408 is equal to the sum of the angle 404 and the angle 406, thus minimizing the aberration of the light spot received by the DMD chip 114.

In conclusion, the invention has the following advantages:

1. The invention replaces a conventional relay lens with an ellipsoidal reflector, so as to prevent the chromatic aberration caused by the conventional relay lens. In addition, an optical compensation device that affects the chromatic aberration less is provided to resolve the aberration at the same time. Furthermore, a framework as in the foregoing embodiment of FIG. 4 with two ellipsoidal reflectors is provided to produce a light spot with no chromatic aberration and the smallest possible spherical aberration on the DMD chip.

2. In the conventional framework with a relay lens, light needs to pass through several lenses, and the loss of light intensity is hard to avoid. The invention uses reflections to guide light, thus reducing light intensity loss substantially and improving the efficiency of the light-guiding apparatus.

3. The light-guiding apparatus of the invention is easier to design than the conventional relay lens composed of several lenses and includes fewer devices. It is therefore easily maintained and cheaper to produce.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light guiding apparatus for an illumination system, comprising:
   a first ellipsoidal reflector, being a partial ellipsoid casing; and
   a light tunnel;
   wherein light emitted from the light tunnel is reflected and focused on a digital micro-mirror device(DMD) chip by the first ellipsoidal reflector, the light tunnel and a long axis of the first ellipsoidal reflector form a first angle, and the first angle and an eccentricity of the first ellipsoidal reflector modify the light emitted from the light tunnel to fit an incident angle and an effective dimension of the DMD chip.

2. The light guiding apparatus for an illumination system of claim 1, wherein the light guiding apparatus further comprises a light path turning device, the light path turning device is configured in a light path between the first ellipsoidal reflector and the DMD chip to turn an image generated by the DMD chip.

3. The light guiding apparatus for an illumination system of claim 2, wherein the light path turning device comprises a total internal reflection prism.

4. The light guiding apparatus for an illumination system of claim 1, wherein the light guiding apparatus further comprises an optical compensation device, and the optical compensation device is configured in a light path between the first ellipsoidal reflector and the DMD chip to compensate for an aberration generated by the first ellipsoidal reflector.

5. The light guiding apparatus for an illumination system of claim 4, wherein the optical compensation device comprises a wedge prism.

6. The light guiding apparatus for an illumination system of claim 4, wherein the optical compensation device comprises a compensation lens.

7. The light guiding apparatus for an illumination system of claim 4, wherein the optical compensation device is a second ellipsoidal reflector, the second ellipsoidal is a partial ellipsoid casing, a second focus of the second ellipsoidal reflector overlays a first focus of the first ellipsoidal reflector, the long axis of the first ellipsoidal reflector and a main light path of the light form a second angle at the second focus, the long axis of the first ellipsoidal reflector and a long axis of the second ellipsoidal reflector form a third angle, and the first angle, the second angle, the third angle, the eccentricity of the first ellipsoidal reflector and an eccentricity of the second ellipsoidal reflector modify the light emitted from the light tunnel to fit the incident angle and the effective dimension of the DMD chip.

8. The light guiding apparatus for an illumination system of claim 7, wherein the third angle is equal to a sum of the first angle and the second angle.

9. A light guiding apparatus for an illumination system, comprising:
   a first ellipsoidal reflector, being a partial ellipsoid casing;
   a light tunnel; and
   a second ellipsoidal reflector, being a partial ellipsoid casing;
   wherein a second focus of the second ellipsoidal reflector overlays a first focus of the first ellipsoidal reflector, wherein light emitted from the light tunnel is reflected sequentially by the first ellipsoidal reflector and the second ellipsoidal reflector and is focused on a digital micro-mirror device(DMD) chip, and the light tunnel and a long axis of the first ellipsoidal reflector form a first angle, the long axis of the first ellipsoidal reflector and a main light path of the light form a second angle at the second focus, the long axis of the first ellipsoidal reflector and a long axis of the second ellipsoidal reflector form a third angle, and the first angle, the second angle, the third angle, an eccentricity of the first ellipsoidal reflector and an eccentricity of the second ellipsoidal reflector modify the light emitted from the light tunnel to fit an incident angle and an effective dimension of the DMD chip.

10. The light guiding apparatus for an illumination system of claim 9, wherein the light guiding apparatus further comprises a light path turning device, and the light path turning device is configured in a light path between the first ellipsoidal reflector and the DMD chip to turn a image generated from the DMD chip.

11. The light guiding apparatus for an illumination system of claim 10, wherein the light path turning device comprises a total internal reflection prism.

12. The light guiding apparatus for an illumination system of claim 10, wherein the third angle is equal to a sum of the first angle and the second angle.

* * * * *